US007797883B2

(12) United States Patent
Tarbell et al.

(10) Patent No.: US 7,797,883 B2
(45) Date of Patent: Sep. 21, 2010

(54) ROOF SUPPORT APPARATUS FOR SOLAR PANELS

(75) Inventors: Ben Tarbell, Palo Alto, CA (US); Christine Concho, Barstow, CA (US); Soren Jensen, Oakland, CA (US); Zack Ardell-Smith, San Leandro, CA (US)

(73) Assignee: SolarCity Corporation, Foster City, CA (US)

( * ) Notice: Subject to any disclaimer, the term of this patent is extended or adjusted under 35 U.S.C. 154(b) by 131 days.

(21) Appl. No.: 12/349,158

(22) Filed: Jan. 6, 2009

(65) Prior Publication Data

US 2010/0170163 A1    Jul. 8, 2010

(51) Int. Cl.
*E04G 3/08*    (2006.01)

(52) U.S. Cl. .................... 52/27; 52/173.3; 52/710; 52/747.1; 52/126.6; 248/237

(58) Field of Classification Search ............ 52/27, 52/173.3, 710, 708, 711, 747.1, 551, 299, 52/126.6, 126.7; 248/237, 676, 677
See application file for complete search history.

(56) References Cited

U.S. PATENT DOCUMENTS

| | | | | |
|---|---|---|---|---|
| 1,172,664 A | * | 2/1916 | Banes | 52/707 |
| 1,722,241 A | * | 7/1929 | Cummins | 52/710 |
| 3,095,672 A | * | 7/1963 | Di Tullio et al. | 52/710 |
| 3,589,525 A | * | 6/1971 | Allen | 211/162 |
| 3,918,230 A | * | 11/1975 | Carroll | 52/309.17 |
| 4,194,333 A | * | 3/1980 | Paton et al. | 52/235 |
| 4,263,952 A | * | 4/1981 | Kowalski | 411/112 |
| 4,426,813 A | * | 1/1984 | Buzzi, Jr. | 52/27 |
| 4,914,875 A | * | 4/1990 | Gustafson | 52/126.6 |
| 4,948,313 A | * | 8/1990 | Zankovich | 411/85 |
| 4,996,804 A | * | 3/1991 | Naka et al. | 52/126.6 |
| 5,357,721 A | * | 10/1994 | Alvarez | 52/92.2 |
| 5,603,187 A | * | 2/1997 | Merrin et al. | 52/58 |
| 5,746,029 A | * | 5/1998 | Ullman | 52/27 |
| 6,205,719 B1 | * | 3/2001 | Bruce | 52/147 |
| 6,360,491 B1 | * | 3/2002 | Ullman | 52/22 |
| 6,672,018 B2 | * | 1/2004 | Shingleton | 52/173.3 |
| 7,234,566 B2 | * | 6/2007 | Simmons | 187/408 |
| 7,435,134 B2 | * | 10/2008 | Lenox | 439/567 |
| 7,617,649 B2 | * | 11/2009 | Arakawa | 52/506.06 |
| 7,654,057 B2 | * | 2/2010 | Zambelli et al. | 52/710 |
| 7,661,640 B2 | * | 2/2010 | Persson | 248/225.11 |
| 7,686,268 B2 | * | 3/2010 | Terunuma et al. | 248/237 |
| 7,721,492 B2 | * | 5/2010 | Plaisted et al. | 52/173.3 |
| 2002/0078657 A1 | * | 6/2002 | Zambelli et al. | 52/710 |
| 2009/0019796 A1 | * | 1/2009 | Liebendorfer | 52/173.3 |

* cited by examiner

*Primary Examiner*—Brian E Glessner
(74) *Attorney, Agent, or Firm*—Fountainhead Law Group P.C.

(57) ABSTRACT

In one embodiment, the present invention includes a roof support apparatus which may be used for securing a load to a tile-covered roof. The roof support apparatus comprises a mounting plate, a first and second attachment member, an upper support member, and a load. The mounting plate engages its base with an upper surface of the roof. A track of the mounting plate extends parallel to the base and has a width less than a width of said base. The first and second attachment members are adapted to extend downward through an exposed surface of the base on both sides of the track. The upper support member is adapted to pass vertically upward through an opening in a roof covering material, such as tile, and engage a screw which may slide along the tack until the screw and the upper support member are fully engaged.

20 Claims, 8 Drawing Sheets

ROOF SUPPORT APPARATUS FOR SOLAR PANELS

CROSS REFERENCE TO RELATED APPLICATIONS

Not Applicable

BACKGROUND

The present invention relates to roof support, and in particular, to tile roof support apparatus for solar panels.

Satellite dishes and solar panels are often supported upon a roof. These loads stand off from the roof shingles and require support for their weight. These loads may also experience lateral or upward forces which may be caused by large gusts of wind.

Attaching support for tile roofs presents a special problem due to their uneven surfaces and the ceramic and cement material of the tiles which may be brittle. In this case, the roof supports cannot be attached on top of the tile roof. Roof rafters and under-lying decking (like plywood or planking) typically provide the support required to mount loads such as satellite dishes and solar panels to tile roofs. FIG. 1 illustrates an example of a tile roof 100 which may require a mounting of a load.

Tile roof 100 includes rows of adjacent tiles 101 interlocked and successively overlapping each other from one row to another. In some instances, the tiles 101 may be attached by nails hammered into holes (e.g. nail 102) which attach each tile to the under-lying plywood 103. The plywood 103 may be covered by tar paper or other protective material (not shown) which provides an additional barrier to moisture. The underlying plywood 103 is attached to rafter 104 to provide support.

Current support apparatus do not provide adequate support for lateral forces or forces perpendicular to the plane of the roof deck on the supports and may not be rigid enough to prevent movement of the supports. Forces in parallel with the roof line may create pressure on the tiles and may cause cracking of the tiles and subsequent leaks around the area of the support members. Additionally, the loads that require support can be very large. It is generally desirable to improve the load bearing capacity of the support stantions. Finally, given the weight of the loads, it is desirable to mount the support members in underlying rafters or roof support beams. However, such beams typically do not align with the tiles in a way that is conducive for effective mounting. Accordingly, it is desirable to have a roof support apparatus that provides both flexibility and strength in positioning the various points of attachment.

Thus, there is a need for improved roof support. The present invention solves these and other problems by providing tile roof support apparatus for solar panels.

SUMMARY

In one embodiment, the present invention includes a roof support apparatus which may be used for securing a load to a tile-covered roof. The roof support apparatus comprises a mounting plate, a first and second attachment member, an upper support member, and a load. The mounting plate engages its base with an upper surface of the roof. A track of the mounting plate extends parallel to the base and has a width less than a width of said base. The first and second attachment members are adapted to extend downward through an exposed surface of the base on both sides of the track. The upper support member is adapted to pass vertically upward through an opening in a roof covering material, such as tile, and engage a screw which may slide along the tack until the screw and the upper support member are fully engaged.

The following detailed description and accompanying drawings provide a better understanding of the nature and advantages of the present invention.

DETAILED DESCRIPTION

Described herein are techniques for roof support apparatus, which may be used for solar panels for example. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
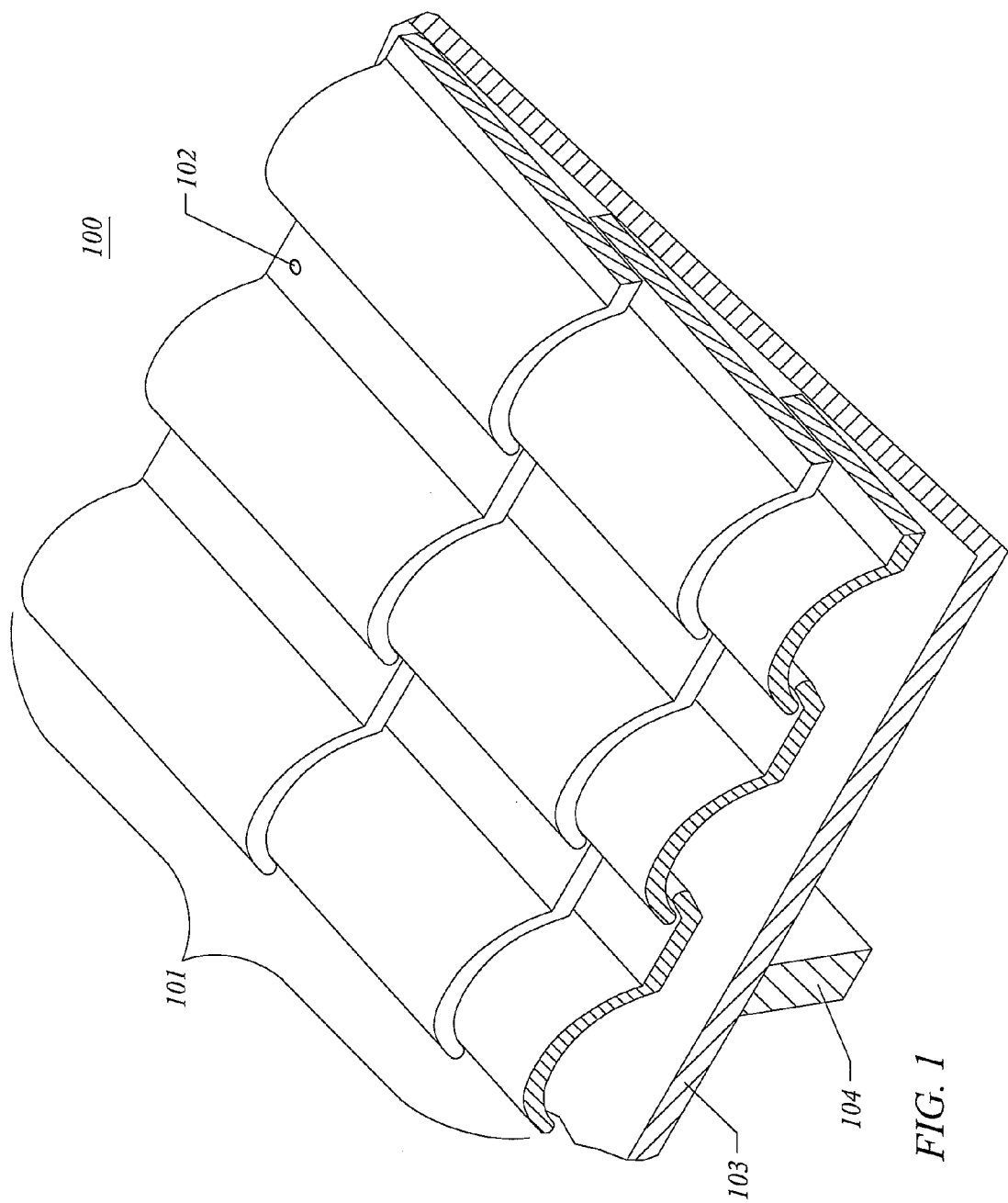
FIG. 1 illustrates an example of a tile roof which may require a mounting of a load.
Figure 2:
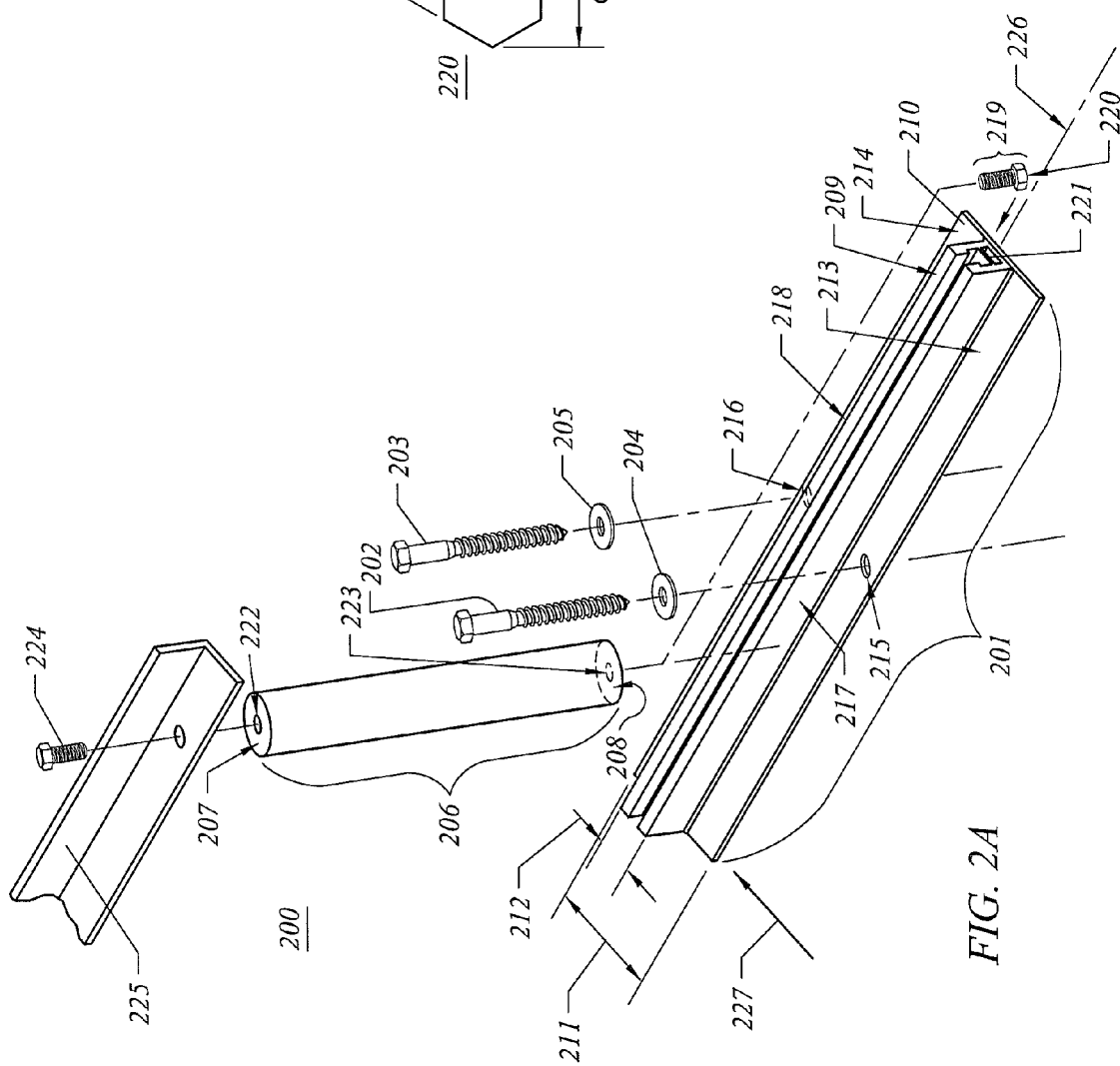
FIG. 2A illustrates an exploded view of a roof support apparatus according to one embodiment of the present invention.
FIG. 2B illustrates a hex head of a hex screw and a square head of a box screw.

FIG. 2A illustrates an exploded view of a roof support apparatus 200 according to one embodiment of the present invention. Roof support apparatus 200 includes mounting plate 201, an upper support member 206, an attachment member 202, an attachment member 203, a screw 219, and two washers (204 and 205). Roof support apparatus 200 provides adjustment of the support while providing support against lateral forces.

The mounting plate may be made from a solid piece or assembly of elongated material such as metal or metal alloy, such as Aluminum, Zinc, or steel, or a reinforced thermoplastic or thermoset material, for example. Mounting plate 201 has a base 210 and a track 209. Track 209 extends parallel to base 210 and protrudes upward from base 210.

Base 210 has a width 211 greater than a width 212 of track 209. The greater width 211 of base 210 forms an exposed surface 213 adjacent to and on one side of track 209 and an exposed surface 214 adjacent to and on the other side of track 209. In this embodiment, base 210 has holes at location 215-216 for attaching the mounting plate onto the roof.

Track 209 has wall 217, wall 218, and an intermediate plate 221. Wall 217-218 and intermediate plate 221 form an internal cavity in which screw head 220 of screw 219 may enter. Intermediate plate 221 extends parallel with base 210 and bridges wall 217 with wall 218 and provides a planar surface in which screw head 220 may lye upside down and perpendicular to base 210. In particular, screw 219 may include a head 220 and threaded cylindrical shaft section, and in this embodiment the head 220 may be positioned in the downward direction such that the threaded shaft section extends in the upward direction as shown. After screw 219 is inserted into the cavity, wall 217 and 218 prevent screw 219 from vertically exiting the cavity. The cavity may have dimensions such that a screw head 220 cannot rotate within the cavity, but may slide freely along track 209.

Upper support member 206 has an elongated shape. In one embodiment, the upper support member 206 is a post, for example. The elongated shape has an upper surface 207 and a lower surface 208. For example, a post may be an elongated cylindrical post having flat distal and proximate ends. The post may also be square, rectangular, hexagonal, or other shapes, for example. A hole at location 223 may be tapped into the bottom portion of upper support member 206 such that the lower surface 208 is penetrated. The resulting tapped hole may be utilized in securing upper support member 206 to mounting plate 201. A second tapped hole at location 222 may be made which penetrates upper surface 207, and a screw 224 may be threaded into the tapped hole to secure a load 225 to upper support member 206. This second tapped hole at location 222 and its corresponding screw may be the means of attachment of load 225 to upper support member 206.

Attachment member 202 and 203 are screws in this embodiment (e.g., wood lag screws). Attachment member 202 passes through a hole at location 215 in surface 213 and attachment member 203 passes through a hole in surface 214 on the other side of track 209 at location 216. The holes may be positioned at the center of the length of the mounting plate 201 along a line perpendicular to the length of the mounting plate on either side of track 209, for example. Attachment members 202-203 are adapted to secure to the same rafter in a roof and prevent movement away from an axis 226. For example, roofs are typically configured at some angle. Accordingly, if a load is mounted to a roof, there is typically a component of force perpendicular to the roof and another component in parallel with the roof. The parallel component may be countered by an equal but opposite force shown at 227. If only one mounting screw were used to attach mounting plate 201 to a roof rafter, the load force and the force in the direction 227 on one end of track 209 may cause a rotational force on mounting plate 201 about a axis 226. In this embodiment, multiple attachments are positioned on either side of track and positioned a distance from axis 226 to improve the strength of the apparatus against such rotational forces, as well as to increase the resistance to fastener pull-out due to uplift forces perpendicular to the plane of the roof deck. Washers 204 and 205 may be used to further secure screws 202 and 203.

FIG. 2B illustrates a hex head 220 of a hex screw and a square head 240 of a box screw. Hex head 220 has a diameter $d_1$ and a diameter $d_2$. A width of the cavity of track 209 formed between wall 217 and 218 may be less than diameter $d_2$ and greater than diameter $d_1$. Accordingly, screw 219 may move along the entire length of track 209. In particular, hex screw head 220 may slide within the cavity of track 209 along the entire length of the track, but is prohibited from rotating within track 209, for example, when upper support member 206 is engaging screw 219 during an assembly. Similarly, square head 240 has a diameter d3 and a diameter d4. In a similar way to hex head 220, the width of the cavity may be less than diameter d4 and greater than diameter d3. More generally, in one example embodiment, the head 220 of a screw 219 may have a first and second flat outer (or radial) surface, such as hex head 220 or square head 240, where first and second flat surfaces are in parallel and separated by a distance less than the distance between walls 217-218 of track 209, and where a distance from one edge of the first flat surface to another edge of the second flat surface is greater than the distance between walls 217-218 of track 209 so that the screw may move inside the track but cannot rotate within the track. For instance, if each flat surface around the perimeter of the screw head has an edge, then a distance from a first edge of a first flat surface to a first edge of a second flat surface is less than the distance between the walls 217-218 to allow horizontal travel along the length of the track. Further, a distance from the first edge of the first flat surface to a second edge of the second flat surface may be greater than the distance between the walls 217-218 to prevent rotation of the screw inside the track.

Figure 3:
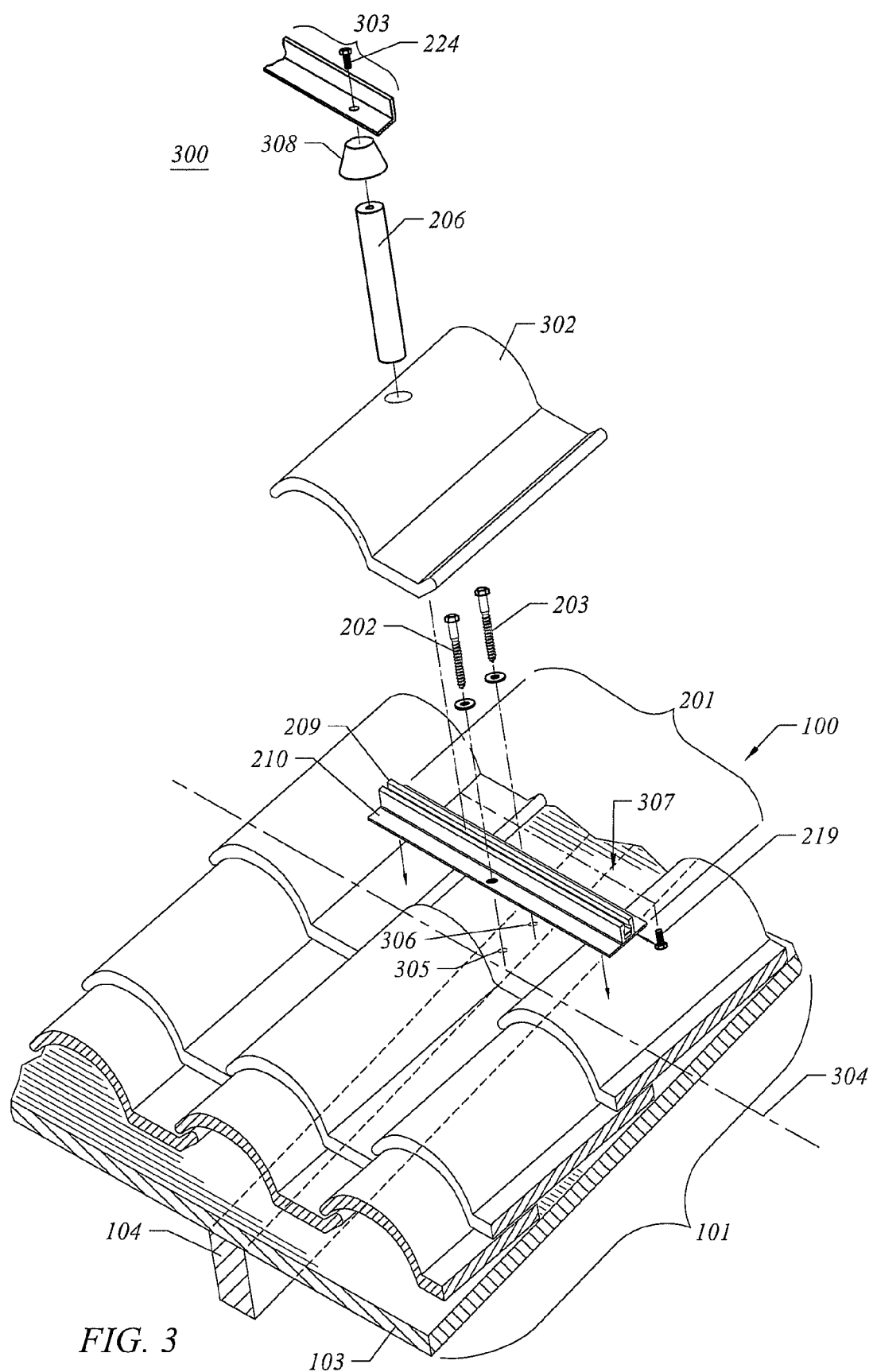
FIG. 3 illustrates an exploded view of an assembly of a roof support apparatus onto a roof according to one embodiment of the present invention.

FIG. 3 illustrates an exploded view of a roof support apparatus onto a roof 100 according to one embodiment of the present invention. The assembly 300 includes mounting plate 201, attachment members 202-203, a roof 100, upper support member 206, screw 219, and a means for attaching a load 303. Roof 100 also includes under-lying plywood 103, rafter 104, and a removed tile 302. The under-lying plywood 103 is attached to rafter 104 to provide support. Roof support apparatus 300 is assembled in a method which provides a secure support of the load 303 to the roof 100 in a straight forward manner.

Roof tile 302 is removed in a location to place a support and a centerline 304 is established which is perpendicular to rafter 104 and on the planar upper surface 307 of the roof 100 (i.e. on the top surface of under-lying plywood 103). Holes 305 and 306 may be piloted to assist in the alignment and orientation of the mounting plate 201. The attachment members 202-203 (e.g. lag bolts) attach the mounting plate 201 to the rafter 104 through holes in mounting plate 201 at location 305 and 306 respectively.

A head of screw 219 is placed into track 209 of mounting plate 201 such that a threaded shaft of screw 219 is exposed above track 209 at a location corresponding to a peak of the tile 302. After the screw 219 is in position, tile 302 is replaced in its original position and an opening is created in tile 302 which will accommodate upper support member 206. The opening (or hole) in the tile may be positioned at a peak (or high point) in the tile so that upper support member 206 extends vertically through tile 302 at the highest point in the tile. Since water will tend to flow down into the valleys (or low points) in the tile, such a configuration improves the ability of the system to keep water from penetrating underneath the tile. The present system may also be used with flat tiles, for example. It is to be understood that the present system may be used with a variety of roofing materials and shapes.

The upper support member 206 is attached to screw 219 through the opening in tile 302. The attaching may include partially engaging upper support member 206 with screw 219 and adjusting a horizontal position of upper support member 206 such that upper support member 206 stands perpendicular to base 210 of mounting plate 201 and may be positioned to engage the hole in the tile. The adjustment may occur as upper support member 206 is rotated onto screw 219 prior to fully engaging upper support member 206 with screw 219. In other words, upper support member 206 may be partially threaded onto screw 219, then moved along the track to a position where the tile may be reinserted onto the roof such that the upper support member 206 passes through the hole in the tile. Support member 206 may consist of two pieces to extend the length if needed for variations in roof geometry or tile height.

Flashing 308 may be added to the assembly by placing the upper support member through a hole in the flashing 308 and aligning the flashing so that it conforms to the shape of tile 302.

The load 303 may be attached to the upper support member using a screw 224 and a tapped hole as previously described.

Figure 4:
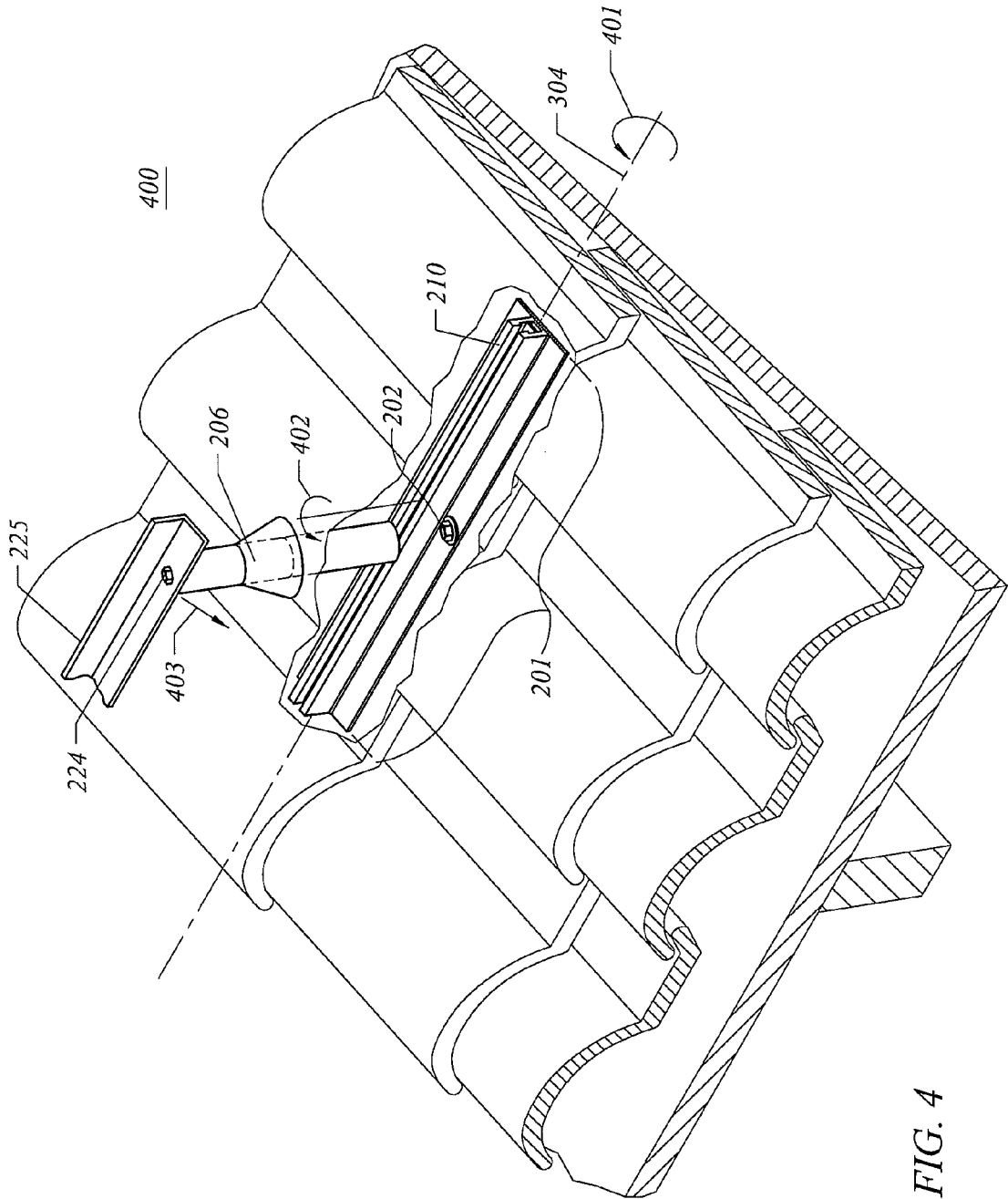
FIG. 4 illustrates a mounting plate engaged upon the roof according to one embodiment of the present invention.

FIG. 4 illustrates the roof support apparatus upon the roof 400 according to one embodiment of the present invention. Assembly 400 shows the mounting plate 201, attachment member 202, and upper support member 206 in a fully assembled position on a roof. Attachment member 203 (not shown) would be fully engaged similar to attachment member 202 on the other side of the track. Bolt 224 attaches load 225 through a tapped hole (not shown) on the upper surface of the upper support member 206. It is to be understood that the shape and configuration of the load may be of a variety of shapes for engaging the upper surface of the upper support member. An L-Beam with a hole for receiving screw 224 is shown here only as an example.

A lateral force 403 on upper support member 206 may create a torque 401 and/or 402. Attachment members 202-203 provide support and prevent a movement away from centerline 304. In particular, since upper support member 206 may be located at either end of mounting plate 201, force 403 may cause torque 402 around the center point of the plate 201. Multiple attachment members located a distance from the centerline 304 provide reinforcement against such rotational stress. Additionally, lower surface of upper support member 206 abuts against a portion of the top surface of track 209 of mounting plate 206. Accordingly, force 403 results in a torque 401 around centerline 304. Again, the use of multiple attachment members positioned a distance from the centerline 304 through surfaces that create a widened base for the mounting plate provide additional support against such forces.

Figure 5:
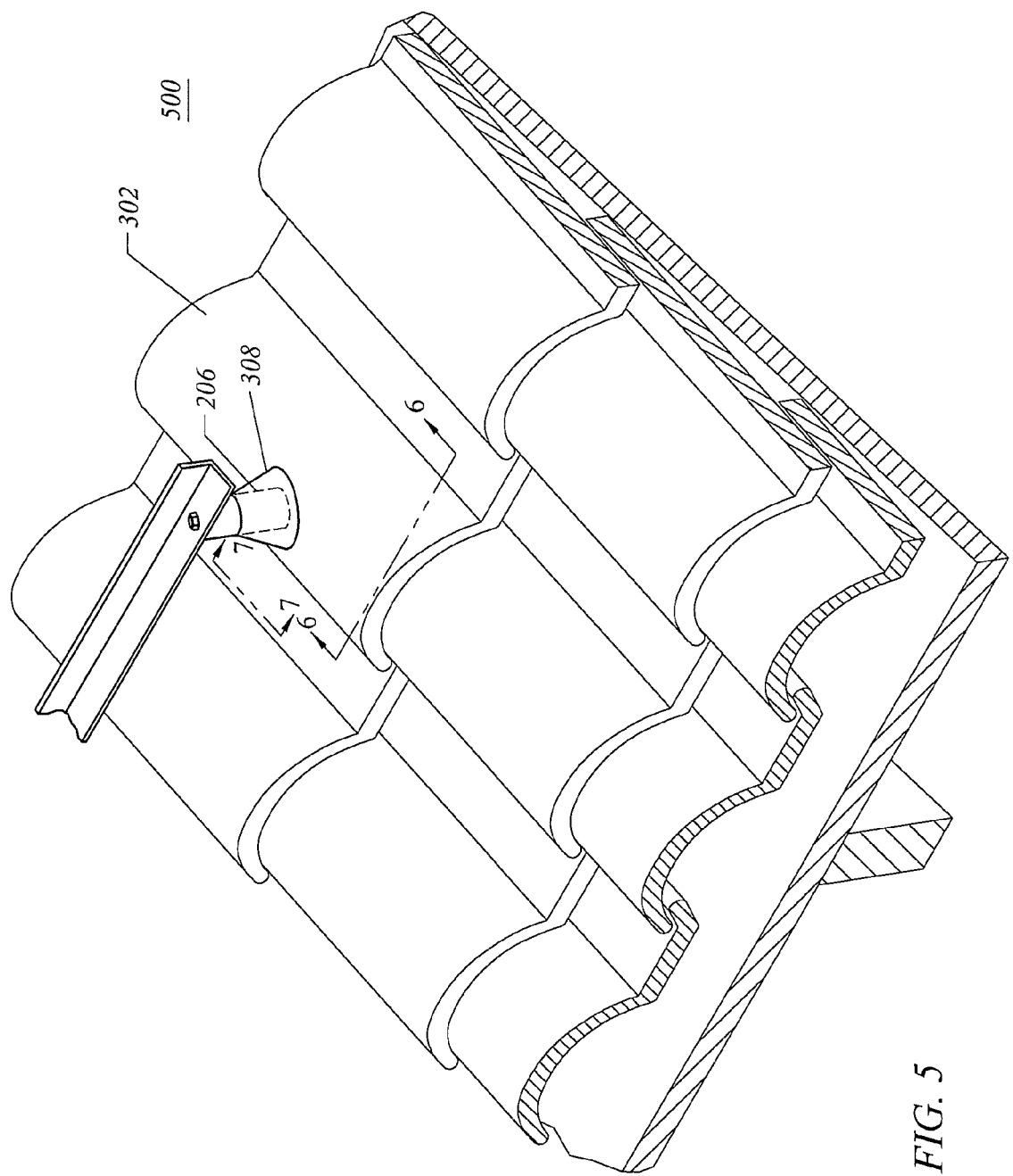
FIG. 5 illustrates a roof support apparatus after flashing has been added according to another embodiment of the present invention.

FIG. 5 illustrates a roof support apparatus after flashing 308 has been added 500 according to another embodiment of the present invention. Upper support member 206 is adapted to pass vertically upward through the opening of tile 302. Roof support apparatus may include flashing 308 formed to the shape of tile 302 such that water does not enter through the hole in tile 302. Flashing 308 may be pre-formed to the cross-sectional shape of upper support member 206. Flashing 308 may extend outward from the upper support member 206 to provide covering for a space between the hole in the tile and the edges of upper support member 206 to prevent water leakage. Different embodiments of flashing may cover from the edge of the upper support member 206 to an area around the hole or even cover the whole tile, for example. A sealant may also be inserted into the region between the upper support member 206 and the hole in the tile, for example.

Figure 6:
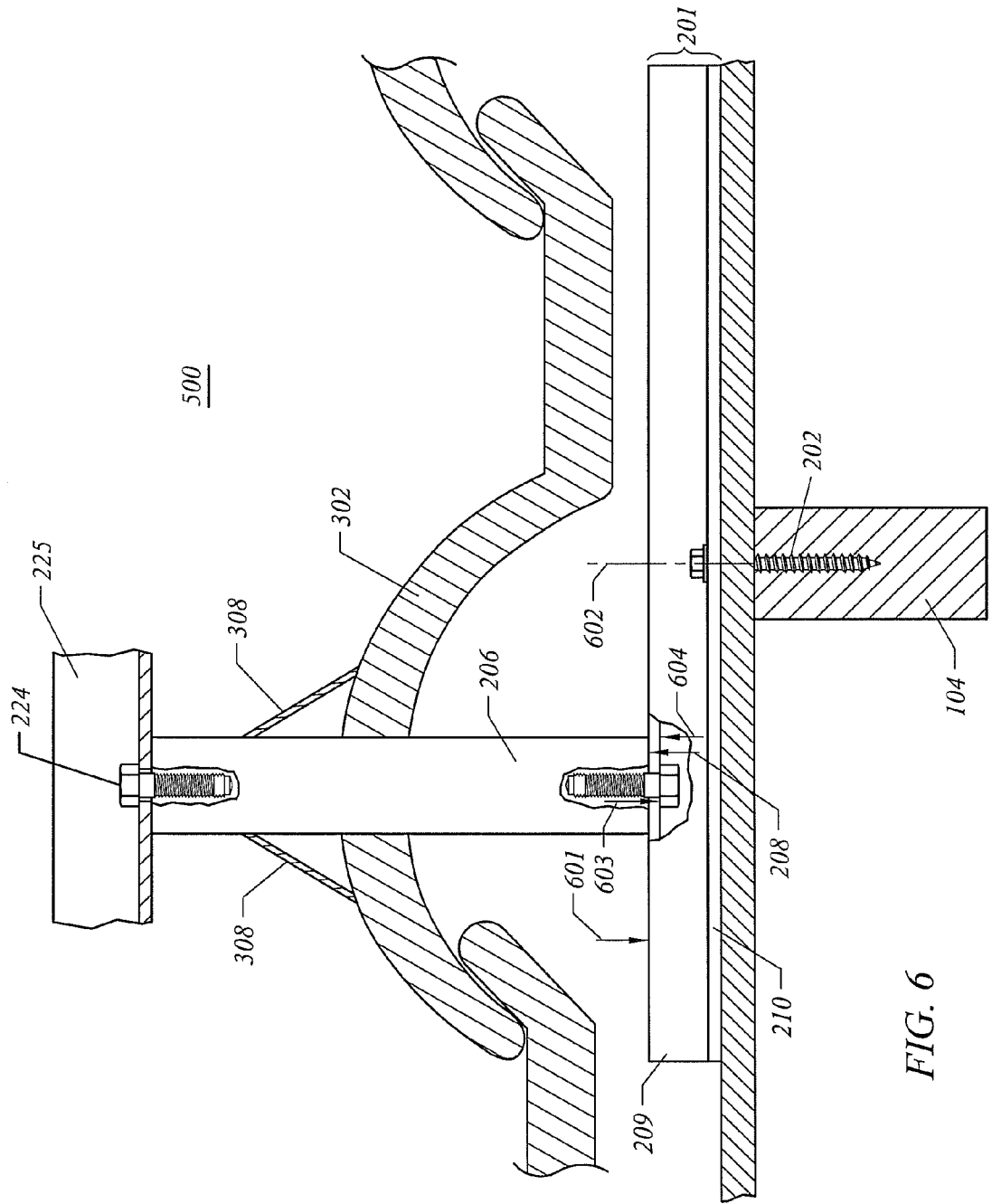
FIG. 6 illustrates a vertical cross-sectional view of roof support apparatus 500 taken on line 6-6 of FIG. 5.

FIG. 6 illustrates a vertical cross-sectional view of roof support apparatus 500 taken on line 6-6 of FIG. 5. Mounting plate 201 is positioned flush with the roof surface. Attachment member 202 (i.e. lag screw in this embodiment) is adapted to extend downward through support rafter 104. A portion of attachment member 202 is screwed (i.e., attached) into support rafter 104 and a portion of attachment member 202 is abut against a previously exposed surface of the base 210 of mounting plate 201 to secure mounting plate 201 to the roof. Attachment member 203 (not shown) attaches mounting plate 201 to support rafter 104 in a similar manner. In this embodiment, two holes located midway 602 on the base 210 of mounting plate 201 allow for placement of the attachment members 202-203. Holes may be placed off center in other embodiments. Additional holes may also be used.

Screw 219 may be inserted into track 209 and positioned to engage upper support member 206 such that upper support member 206 extends upward through a hole in the tile. In this example, mounting plate 201 and track 209 have a length that is greater than a width of the tile. Since the position of a rafter 104 may be offset from the position of a hole in the tile, it may be desirable to provide mounting plates that are sufficiently long so that the screw 219 and upper support member 206 may be positioned into alignment with the tile hole regardless of the location of the rafter 104. Accordingly, the length of the track, and the mounting plate if they are the same length, may be approximately equal to the distance between rafters, for example. Further, additional holes may be added to the surfaces in the mounting plate (e.g., off center) to extend the reach of the track. If the mounting plate and track are configured to be strong enough to support the cantilevered loads, the mounting holes may be positioned off center to extend the cantilever further.

A load may include a solar panel attached using an L beam 225, for example. L beam 225 utilizes screw 224 and tapped hole to attach the load to upper support member 206. Upper support member 206 extends vertically through tile 302 at a peak (or high point) in the tile. Flashing 308 provides protection against water leakage through the roof.

A portion of lower surface 208 of upper support member 206 abuts against a portion of at least one upper surface 601 of track 209 and a portion of screw head 603 abuts against a portion of at least one internal surface 604 of track 209 when screw 219 is fully engaged to secure the load and upper support member 206 to the mounting plate as shown.

Figure 7:
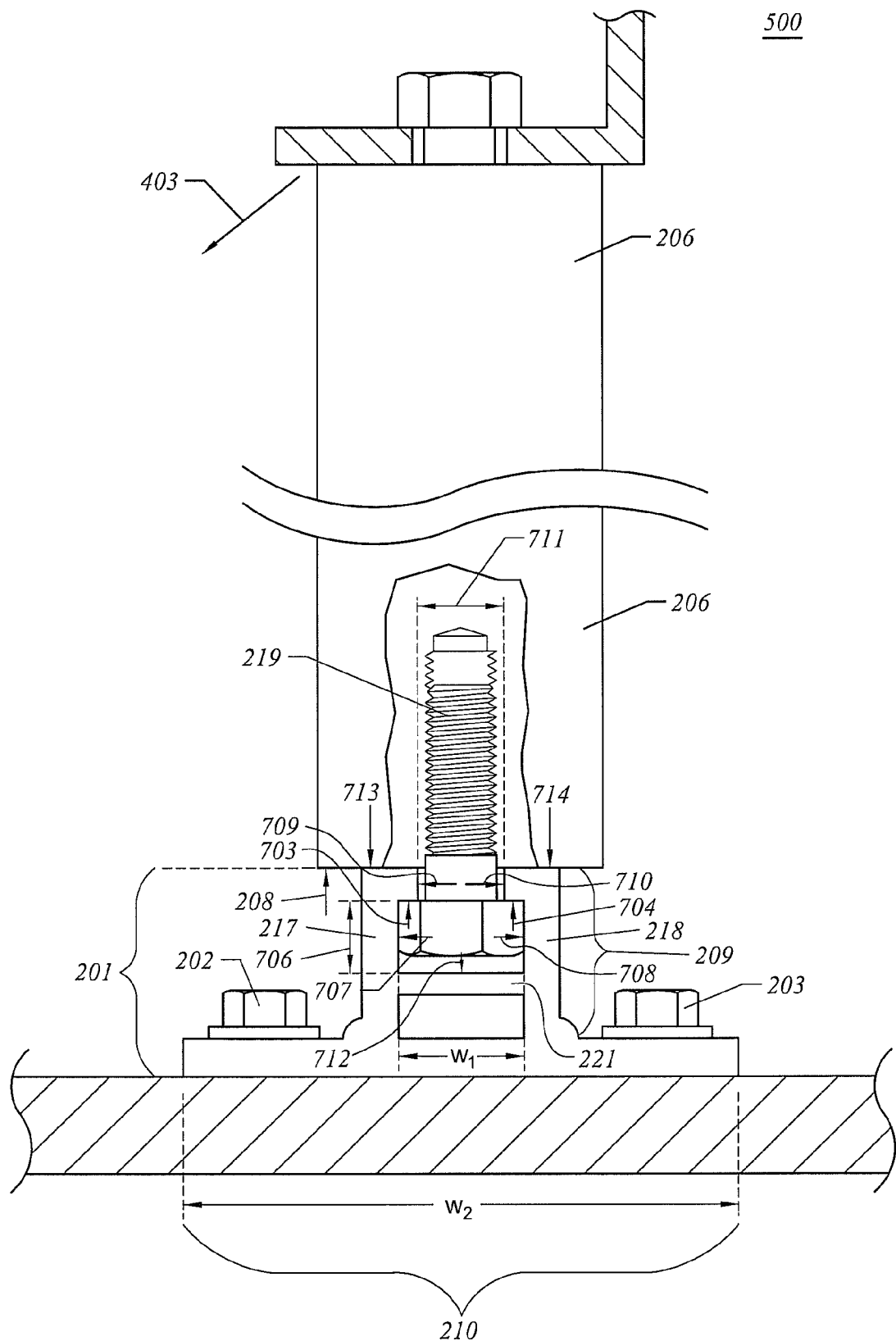
FIG. 7 illustrates a vertical cross-sectional view of the roof support apparatus 500 taken on the line 7-7 of FIG. 5.

FIG. 7 illustrates a vertical cross-sectional view of the roof support apparatus 500 taken on the line 7-7 of FIG. 5. The illustration shows mounting plate 201, upper support member 206, and attachment members 202-203. Mounting plate 201 includes track 209 and base 210. Base 210 has a width $W_2$ which is wider than the width of track 209. Width $W_2$ provides support against lateral force 403.

Track 209 includes a wall 217, wall 218, and may include intermediate plate 221, which define an internal cavity of track 209. Wall 217 has internal surface 707 which is perpendicular to base 210 and internal surface 703. Wall 218 has internal surface 708 which is perpendicular to base 210 and internal surface 704. Internal surfaces 707-708 define the width of the cavity $W_1$. $W_1$ is less than diameter $d_2$ of screw head 220 of FIG. 2B and greater than diameter $d_1$ of screw head 220 of FIG. 2B. This allows screw 219 to move along track 209 when screw 219 is not fully engaged with track 209 and upper support member 206. This also allows for upper support member 206 to be rotated to engage screw 219 such that screw 219 does not rotate within the track cavity, and upper support member may be tightened onto track 209 by rotating upper support member. FIG. 7 illustrates apparatus 500 with screw 219 fully engaged with track 209 and upper support member 206.

Wall 217 includes an end surface 709 and wall 218 includes an end surface 710. A distance 711 between end surface 709 and end surface 710 is greater than the diameter of a threaded shaft of screw 219 so that screw 219 may travel horizontally along track 209. Distance 711 is smaller than the diameter of the screw head to prevent screw 219 from being vertically removed from the cavity. Accordingly, the screw may travel freely in the horizontal direction along the track but is vertically locked within the cavity.

A height 706 of the cavity of track 209 is defined by surfaces 703-704 and an upper surface 712 of intermediate plate 221. Height 706 is great enough to allow movement of screw 219 when screw 219 is not fully engaged with upper support member 206. Height 706 is small enough to allow screw 219 to extend vertically out of said track 209 when screw 219 is not engaged with upper support member 206. It is to be understood that intermediate plate may be optional. In other embodiments, the head of the screw may rest on the base or the height of the track may be reduced, for example.

A portion of an upper surface 713 of wall 701 and a portion of an upper surface 714 of wall 702 makes contact with a portion of lower surface 208 of upper support member 206 when screw 219 is fully engaged as shown. This contact area provides for additional support against lateral force 403.

Figure 8:
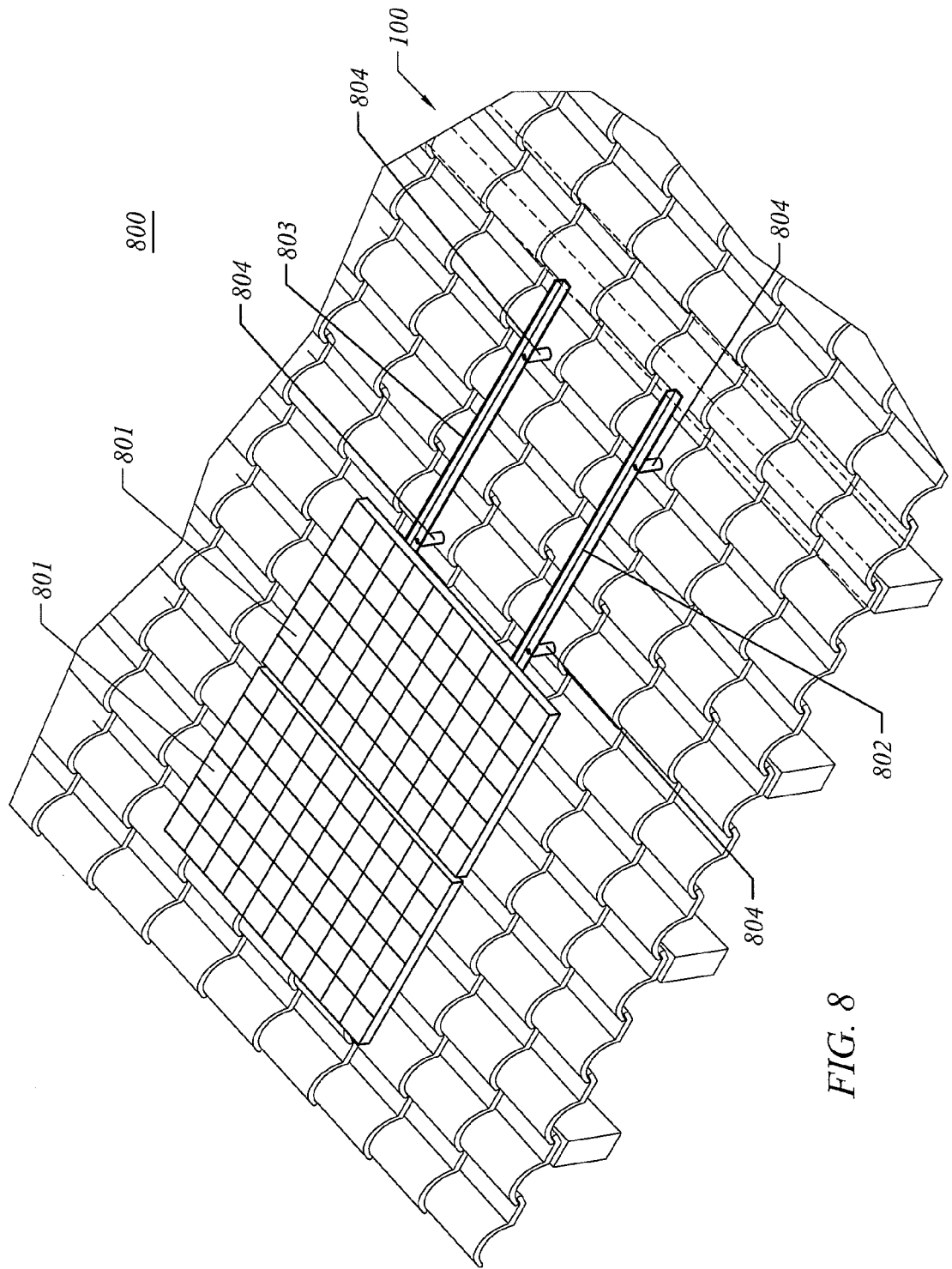
FIG. 8 illustrates a plurality of solar panels utilizing a plurality of roof support apparatus according to another embodiment of the present invention.

FIG. 8 illustrates a solar panel roof system 800 according to another embodiment of the present invention. Solar panel roof system 800 includes a plurality of solar panels 801 attached to L beams 802-803. L beams 802-803 are supported above roof 100 by a plurality of roof support apparatus 804. Each roof support apparatus of the plurality of roof support apparatus 804 may by similar to roof support apparatus described above. The means for attaching the solar panel to each of the roof support apparatus may vary as described above.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A support apparatus for securing a load to a roof comprising:
   a mounting plate engaging an upper surface of said roof, said mounting plate comprising elongated base and a track extending parallel to said base, wherein said track extends upward from said base, said base having a width greater than a width of said track and forming a first exposed surface adjacent to a first side of said track and a second exposed surface adjacent to a second side of said track;
   a first attachment member adapted to extend through said first exposed surface for attaching said mounting plate to said roof, said first attachment member having a first portion attached to a supporting rafter in said roof, and a second portion abut against said first exposed surface when said first portion is attached;
   a second attachment member adapted to extend through said second exposed surface for attaching said mounting plate to said roof, said second attachment member having a first portion attached to the rafter in said roof, and a second portion abuts against said second exposed surface when said first portion is attached;
   an upper support member adapted to pass vertically upward through an opening in a tile, said upper support member having an elongated shape and a tapped hole, said elongated shape having an upper surface and a lower surface, said tapped hole penetrating said lower surface;
   a screw having a head movably engaged with said track in said horizontal direction and a threaded shaft extending upward above said track for engaging said tapped hole in the lower surface of said upper support member; and
   a load attached to said upper surface of said upper support member,
   wherein said track and said screw allow horizontal adjustment of said upper support member relative to said mounting plate when said screw is not fully engaged with said upper support member.

2. The apparatus of claim 1 wherein the first exposed surface includes at least one hole and the second exposed surface includes at least one hole, and wherein the first attachment member is a screw extending through said hole in said first exposed surface into a rafter, and wherein the second attachment member is a screw extending through said hole in said first exposed surface into the rafter.

3. The apparatus of claim 2 wherein the at least one hole in said first exposed surface and said at least one hole in said second exposed surface are positioned in the center of the mounting plate along a line perpendicular to the elongated base.

4. The apparatus of claim 1 wherein a portion of said lower surface of said upper support member abuts against a portion of at least one upper surface of said track of said mounting plate and a portion of said screw abuts against an internal surface of said track when said screw is fully engaged with said upper support member.

5. The apparatus of claim 1 wherein said track comprises a first wall and a second wall, and wherein the head of said screw comprises a first flat radial surface and a second flat radial surface, and wherein first and second flat radial surfaces are in parallel and separated by a distance less than the distance between the first and second walls.

6. The apparatus of claim 5 wherein a distance from a first edge of the first flat radial surface to a first edge of the second flat radial surface is less than the distance between the first and second walls, and wherein a distance from the first edge of the first flat radial surface to a second edge of the second flat radial surface is greater than the distance between the first and second walls.

7. The apparatus of claim 1 further including a flashing, said flashing fitting around said upper support member.

8. A support apparatus for securing a load to a roof comprising:
   a mounting plate, said mounting plate comprising,
      a base, and
      a track extending parallel to said base and protruding upward from said base, said track having a first wall and a second wall, said first and second wall defining a width of a cavity, said first wall having a first internal surface perpendicular to said base and a second internal surface parallel with said base, said second wall having a first internal surface perpendicular to said base and a second internal surface parallel with said base, said first internal surface of said first wall facing said first internal surface of said second wall;
   a screw comprising a head and a threaded shaft; and
   a post having a first end including a threaded hole for receiving said threaded shaft of said screw;
   wherein the width of the cavity is less than a first diameter of said head of said screw and is greater than a second diameter of said head such that said head may travel down said track within said cavity without said head being able to rotate.

9. The apparatus of claim 8 wherein said first wall includes an end surface and said second wall includes an end surface, said end surface of said first wall facing said end surface of said second wall, wherein a distance between said end surface of said first wall and said end surface of said second wall is greater than a diameter of the shaft of said screw to allow said screw to travel horizontally down said track, and wherein the distance between said end surface of said first wall and said end surface of said second wall is less than any radial distance between opposite sides of said head of said screw to prevent said screw from being vertically removed from the cavity of the track.

10. The apparatus of claim 9 wherein said track further includes an intermediate plate extending parallel with said base and bridging a portion of said first wall with said second wall, said intermediate plate defining a lower bound of said cavity and providing a planar surface such that said screw may lie head down and perpendicular to said base.

11. The apparatus of claim 10 wherein a height between an upper surface of said intermediate plate and said second internal surface of said first wall matches a second height between said upper surface of said intermediate plate and said second internal surface of said second wall, said height being greater than a thickness of said head of said screw to allow movement of said head of said screw along said track when said screw is not fully engaged to said upper support member.

12. The apparatus of claim 8 wherein said mounting plate has a length greater than a width of said mounting plate and said mounting plate is made of a solid piece of elongated material.

13. The apparatus of claim 12 wherein the width of said base is greater than the width of said track.

14. The apparatus of claim 13 wherein the base comprises a first exposed surface adjacent to a first side of said track and a second exposed surface adjacent to a second side of said track.

15. The apparatus of claim 14 wherein the base comprises one or more holes on each side of said track for attaching said mounting plate to a surface of a roof.

16. The apparatus of claim 8 further comprising a flashing, said flashing fitting around said post support member.

17. A method for securing a load to a roof, said method comprising:

engaging a mounting plate on an upper surface of said roof, said mounting plate comprising elongated base and a track extending parallel to said base, wherein said track extends upward from said base, said base having a width greater than a width of said track and forming a first exposed surface adjacent to a first side of said track and a second exposed surface adjacent to a second side of said track;

attaching a first attachment member through said first exposed surface into said roof to attach said mounting plate to said roof, said first attachment member having a first portion attached to a supporting rafter in said roof, and a second portion abut against said first exposed surface when said first portion is attached;

attaching a second attachment member through said second exposed surface into said roof to attach said mounting plate to said roof, said second attachment member having a first portion attached to the rafter in said roof, and a second portion abut against said second exposed surface when said first portion is attached;

inserting a head of a screw into said track, wherein a threaded shaft of said screw is exposed above said track at a location corresponding to a predetermined mounting position on said roof a perpendicular distance from said rafter;

creating an opening in a roof covering material at said predetermine mounting position;

attaching an upper support member through the opening in said covering material to said screw, said upper support member having an elongated shape, an upper surface, and a lower surface, said lower surface including a threaded hole for engaging said threaded shaft of said screw; and attaching said load to said upper surface of said upper support member.

18. The method of claim 17 further comprising adding a flashing to an exposed portion of said upper support member above said roof covering material, wherein the roof covering material is tile.

19. The method of claim 17 wherein attaching said load to said support member includes screwing a second screw into a second tapped hole of said upper support member, said second tapped hole penetrating said upper surface of said upper support member.

20. The method of claim 17 wherein attaching an upper support member includes tightening said upper support member onto said screw such that said lower surface of said upper support member abuts against at least one upper surface of said track of said mounting plate and a portion of said screw abuts against at least one portion of at least one internal surface of said track.

* * * * *